United States Patent

[11] 3,587,799

| [72] | Inventor | Jean Thomas Chamberland<br>Quebec City, Quebec, Canada |
|---|---|---|
| [21] | Appl. No. | 854,915 |
| [22] | Filed | Sept. 3, 1969 |
| [45] | Patented | June 28, 1971 |
| [73] | Assignee | Mecanada Limited<br>Villeneuve, Canada |
| [32] | Priority | July 10, 1969 |
| [33] | | Canada |
| [31] | | 056,717 |

[54] FRICTIONAL AND POSITIVE PROGRESSIVE ENGAGEMENT CLUTCH
6 Claims, 4 Drawing Figs.

[52] U.S. Cl. .................................................. 192/53,
192/70.27
[51] Int. Cl. .................................................. F16d 23/04
[50] Field of Search .......................................... 192/53, 53
(.2); 192/70.27

[56] References Cited
UNITED STATES PATENTS

| 835,721 | 11/1906 | Anderson et al. | 192/53(.2) |
| 1,368,888 | 2/1921 | Brown | 192/53(.2) |
| 1,531,158 | 3/1925 | Thorington | 192/53(.2) |
| 1,859,351 | 5/1932 | Zancan | 192/53(.2)(X) |
| 2,682,327 | 6/1954 | Retz | 192/53(.2) |

*Primary Examiner*—Allan D. Hermann
*Attorney*—Fetherstonhaugh and Co.

ABSTRACT: A drive shaft has a hub secured thereto and a driven member is rotatable on the hub. Inner and outer clutch shells project from the hub and driven member respectively, and a space between the shells contains a set of clutch plates with friction discs interposed therebetween, the plates being rotatable with one shell and the friction discs with the other. A positive drive member is secured to the hub and is slidable into and out of a locking engagement with the outer shell, being actuated by a slidable rod which extends through the drive shaft. A spring-pressed pressure member at the outside of the drive member has pins to exert pressure against the clutch plates and friction discs so that as the drive member is moved from its disengaged toward its engaged position, a friction drive is established and progressively increased until a positive drive takes over by locking engagement of the drive member with the outer shell.

PATENTED JUN 28 1971

INVENTOR
Jean Thomas CHAMBERLAND

Fetherstonhaugh & Co.

PATENT AGENTS

INVENTOR
Jean Thomas CHAMBERLAND

PATENT AGENTS

FRICTIONAL AND POSITIVE PROGRESSIVE ENGAGEMENT CLUTCH

This invention relates to new and useful improvements in progressive engagement clutches of the frictional and positive type, and in particular the invention concerns itself with an improved clutch which may be effectively employed in so-called steering by driving of vehicles equipped with endless tracks or treads, such as for example, snowmobiles, small tractors, and the like.

Such vehicles effect their steering by driving a track on one side of the vehicle at a different speed than the track on the other side, the speed differential being obtained by a combination brake and clutch arrangement in which the clutch is continuously "hunting" and considerable wear results. Moreover, although such an arrangement is quite satisfactory at low speeds, it makes the steering hard to control when high speeds of travel are encountered.

It is, therefore, the principal object of the invention to avoid the above outlined disadvantages of conventional steering by driving mechanisms of double endless track vehicles, this being attained by embodying in the drive of each track a frictional and positive progressive engagement clutch which affords greatly reduced wear characteristics and has very good steering properties.

The clutch of the invention is simple in construction, efficient in operation, and lends itself to economical manufacture.

With the foregoing more important object and features in view and such other objects and features which may become apparent as this specification proceeds, the invention will be understood from the following description taken in conjunction with the accompanying drawings, wherein like characters of reference are used to designate like parts, and wherein.

Figures 3A, 3B:
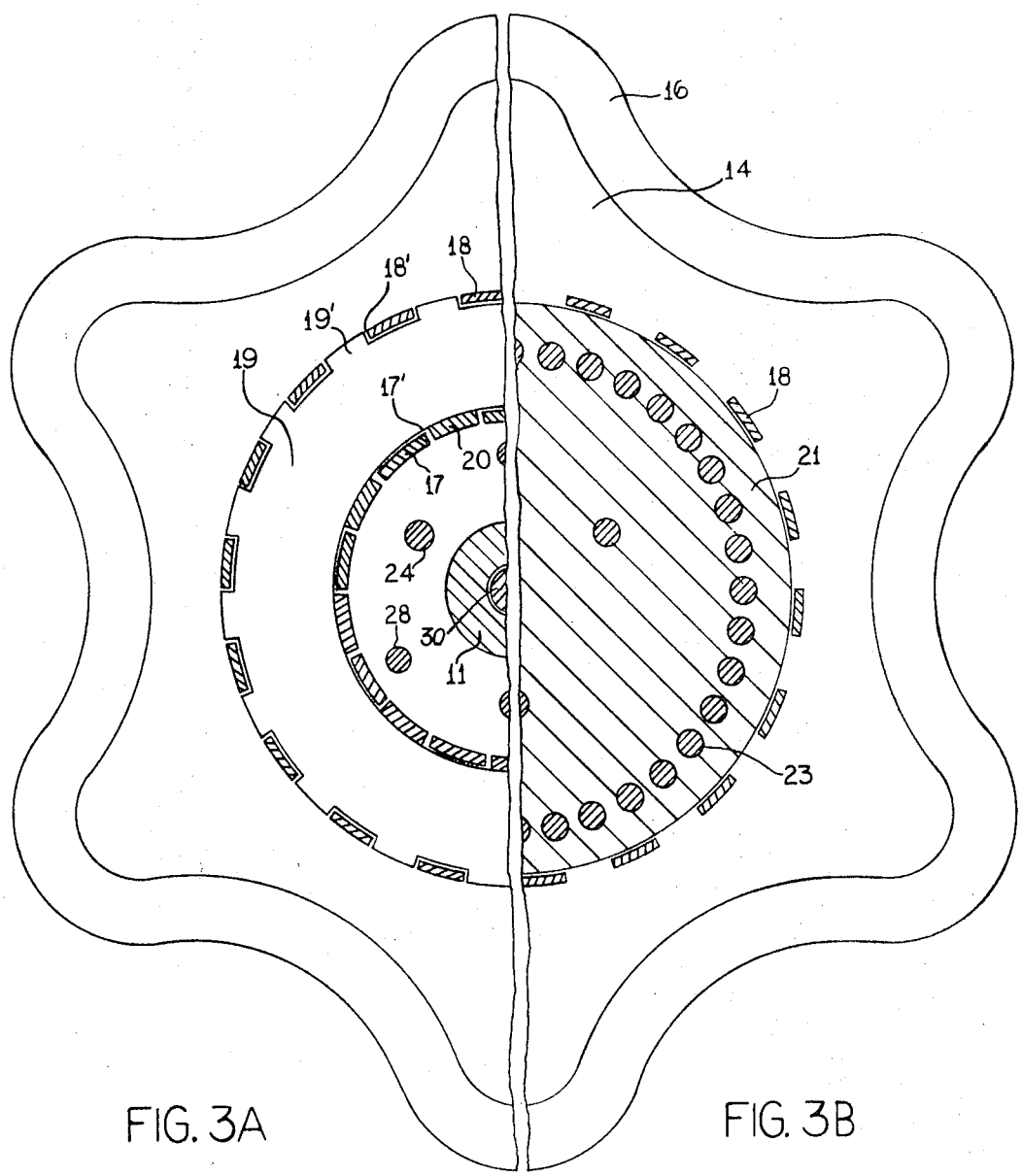
FIG. 3 is a composite elevational and sectional view, with its left-hand portion taken substantially in the plane of the line 3A–3A and its right-hand portion taken substantially in the plane of the line 3B–3B of FIG. 1.

Referring now to the accompanying drawings in detail, the improved clutch of the invention is designated generally by the reference numeral 10 and is used for the transmission of drive from a drive shaft 11 to a driven member 14, which may be the traction wheel of an endless track on one side of a vehicle such as a snowmobile, tractor, or the like, it being understood that the mechanism is duplicated on the opposite side of the vehicle for the other endless track (not shown). The traction wheel 14 may in fact be in the form of a sprocket as shown in FIG. 3 to engage the endless track, and may be provided on its periphery with a layer 16 of rubber or similar material. The wheel 14 is rotatably mounted on the wheel hub 13 by an antifriction bearing 15, and the hub 13 is secured to the drive shaft 11, as by spline means 12.

An annular inner shell 17 is rigidly secured to the hub 13 and projects axially outwardly therefrom. Similarly, an annular outer shell 18 is rigidly secured to the wheel 14 and projects axially outwardly therefrom in radially spaced relation from the inner shell 17. The space between the two shells 17, 18 accommodates a set of annular friction discs 19 which are interposed between a set of annular clutch plates 20. The outer peripheries of the friction discs 19 are provided with teeth 19' which project into slots 18' formed in the outer shell 18, as is best shown in FIG. 3. Similarly, the inner peripheries of the clutch plates 20 are provided with teeth 20' which project into slots 17' formed in the inner shell 17. Thus, the friction discs 19 are rotatable with the outer shell 18 and 14, while the clutch plates 20 are rotatable with the inner shell 17 and hub 13. However, the disc teeth 19' and the plate teeth 20' are slidable axially in the slots 18' and 17' of the shells 18 and 17, respectively, so that the clutch plates and friction discs may be pressed axially together to engage the clutch, or may move slightly apart to permit rotation of the plates between the discs when the clutch is disengaged.

A positive drive member 21, in the form of a circular disc, is disposed exteriorly of the clutch plates 20 and friction discs 19, and is secured coaxially to the hub 13 by a plurality of bolts 28 so that it rotates with the hub. Compression springs 29 are provided on the bolts 28 to bias the member 21 axially inwardly and the outer periphery of the member 21 is provided with teeth 21' which are receivable in the slots 18' of the outer shell 18 so as to lock the member 21 in a positive driving engagement with the shell 18 when the member 21 is slid fully inwardly in the direction of the hub 13.

An optional form which the shell 18 can take and which is not shown on the drawings is to make the shell 18 in the shape of a cylinder with a series of gear teeth on the inside surface. The disc teeth 19' are shaped to engage with the teeth on the shell 18 and the teeth 21' on the drive member 21 also have this same gear configuration which results in a more rugged longer wearing mechanism.

An axially movable pressure member 22 is juxtaposed exteriorly to the drive member 21 and is provided with a plurality of pressure transmitting pins 23 which extend slidably through apertures 31 formed in the member 21 so that the inner ends of the pins may engage the clutch plates 20 and press them axially together with the interposed friction discs 19. The member 22 rotates with and is connected to the hub 13 by a plurality of studs 24 passing through openings 32 in the drive member 21, and the member 22 is biased axially inwardly by compression springs 26 which are positioned on the studs 24 and are seated in suitable cups 27 with which the member 22 is equipped. The springs 26 bear against nuts 25 provided on the studs 24 so that the pressure of the springs may be adjusted to correspondingly vary the pressure exerted by the member 22 through the pins 23 on the clutch plates 29 and friction discs 19.

A clutch-actuating rod 30 is slidably positioned in an axial bore 33 formed in the drive shaft 11 and the outer end of the rod 30 is provided with an enlarged head 35 which bears against the inner face of the drive member 21. The rod 30 is operatively connected to the steering mechanism (not shown) of the vehicle so that it may be slid outwardly form the position shown in FIG. 1 to that shown in FIG. 2, whereby to slide the drive member 21 outwardly against the bias of the springs 29 until the member 21 comes into contact with the member 22 and both members 21 and 22 are then moved outwardly together as outward sliding movement of the rod 30 continues to some extent.

Figures 1, 2:
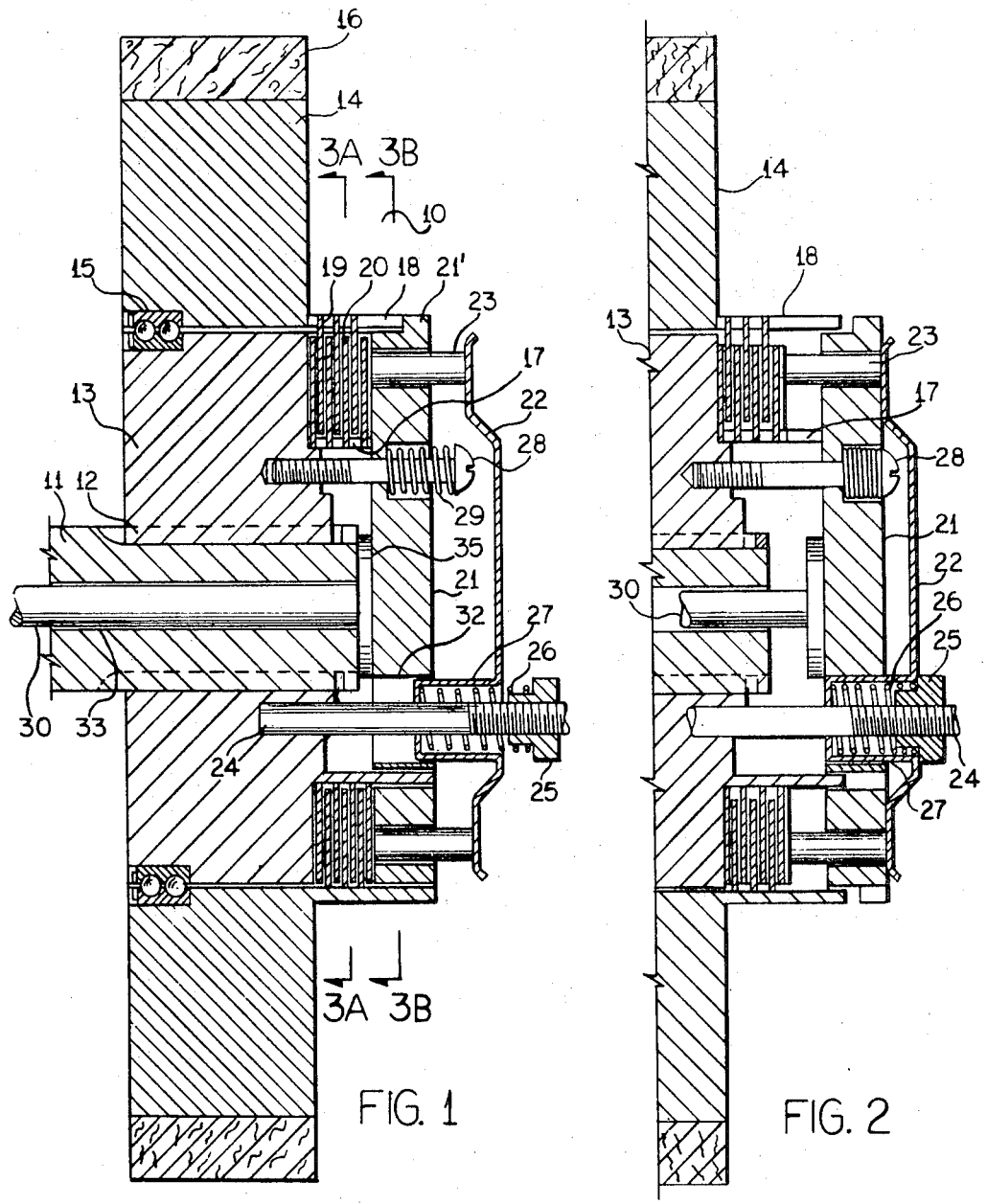
FIG. 1 is a cross-sectional view showing the clutch of the invention in its engaged position.
FIG. 2 is a fragmentary cross-sectional view of the same in its disengaged position.

As already stated, the mechanism is duplicated for the two endless tracks at the opposite sides of the vehicle and when the vehicle is traveling in a straight line, both tracks are required to be driven at the same speed. Under such circumstances the actuating rod 30 of each clutch is in its inwardly slid position as shown in FIG. 1 and the positive drive member 21 is in its fully inwardly slid position so that its teeth 21' are locked in the slots 18' of the outer shell 18 to transmit a positive drive from the hub 13 through the member 21 and shell 18 to the wheel 14. At the same time, the member 21 is spaced axially inwardly from the member 22 and bias of the springs 26 enables the member 22 to exert inward pressure through the pins 23 to the clutch plates 20 and friction discs 19. Thus, in addition to the positive drive already described, a full friction drive is also provided from the hub 13 through the shell 17, the plates 20, discs 19 and the shell 18 to the wheel 14.

However, when the vehicle is to be steered to one side or the other, the drive to the endless track on that side has to be slowed down and this is accomplished by actuating the steering mechanism so that the rod 30 of the clutch on that side is slid outwardly from the position shown in FIG. 1 to that shown in FIG. 2. The initial outward sliding of the rod 30 causes the positive drive member 21 to slide axially outwardly so that its teeth 21' become withdrawn from the slots 18' of the outer shell 18 and the positive drive through the member 21 is thus discontinued. However, the full frictional drive through the clutch plates 29 and discs 19 still continues until the member 21 comes in contact with the pressure disc 22 and, upon further outward sliding of the rod 30, causes the member 22 to move outwardly to some extent. Depending upon the extent of this movement, the pressure exerted by the pins 23 on the plates 20 and discs 19 is reduced so that some amount of slippage of the plates between the discs may occur, until eventually the plates are quite free to rotate between the discs in the fully disengaged position of the clutch when no drive at all is transmitted from the hub 13 to the wheel 14.

Conversely, when the actuating rod 30 is slid from the position shown in FIG. 2 to that in FIG. 1, inward movement of the drive member 21 will be initially accompanied by a corresponding movement of the member 22, thus gradually increasing the pressure of the pins 23 on he clutch plates 20 and friction discs 19 to gradually increase the friction drive from the shell 17 to the shell 18 while the teeth 21' of the member 21 are still disengaged from the slots 18' of the shell 18. By the time the drive member teeth are in position to enter the shell slots, a full frictional drive through the plates 20 and discs 19 will be established, and when the teeth 21' eventually enter the slots 18', a positive drive without any slippage will be provided, as already described.

It will be apparent from the foregoing that the positive and frictional progressive disengagement and frictional and positive progressive engagement of the clutch materially reduces wear of the components. When the vehicle is traveling in a straight line, the clutch parts are positively locked together and no slippage can occur. When steering to one side or the other, the drive on one side is progressively disengaged while that on the other side still remains in positive engagement, and since the clutch is working only one-half the time, a greatly increased clutch life is possible along with the use of smaller clutches and a reduction of cost.

I claim:

1. In a frictional and positive progressive engagement clutch, the combination of a drive shaft, a hub secured to said shaft, an annular driven member rotatably positioned on said hub, an annular inner shell and an annular outer shell projecting axially from said hub and driven member respectively, a set of axially movable clutch plates positioned in an annular space between said inner and outer shells and rotatable with one of said shells, a set of axially movable friction discs interposed between said clutch plates and rotatable with the other of said shells, a positive drive member secured to said hub and movable relative thereto from an outwardly slid disengaged position to an inwardly slid engaged position wherein said drive member is locked with said outer shell to positively rotate said driven member, an axially movable pressure member juxtaposed exteriorly to said drive member, said pressure member being slid outwardly by said drive member when the latter is in its disengaged position, means provided on said pressure member for exerting axial pressure against said clutch plates and interposed friction discs when said drive member is being slid from its disengaged to its engaged position, and means for sliding said drive member.

2. The device as defined in claim 1 together with resilient means biasing said positive drive member inwardly to its engaged position.

3. The device as defined in claim 1 together with resilient means biasing said positive drive member inwardly to its engaged position, said means for sliding said drive member being operative to slide the same outwardly to its disengaged position against the action of said resilient biasing means.

4. The device as defined in claim 3 wherein said means for sliding said drive member outwardly comprise an actuating rod slidable through said drive shaft and abutting said drive member.

5. The device as defined in claim 1 wherein said means for exerting pressure against said clutch plates and friction discs comprise pressure transmitting pins carried by said pressure member, said pins extending slidably through apertures in said drive member to abut said plates and discs, and resilient means biasing said pressure member axially inwardly.

6. The device as defined in claim 5 together with means for adjusting said resilient biasing means whereby to vary the pressure exerted by said pressure member.